(12) United States Patent
Vestreli et al.

(10) Patent No.: US 10,143,328 B2
(45) Date of Patent: Dec. 4, 2018

(54) BEVERAGE PREPARATION SYSTEM

(75) Inventors: Anders Vestreli, Obermeilen (CH);
Samuel Odet, Vevey (CH); Christian Talon, Vufflens-le-Chauteau (CH);
HansPeter Pleisch, Corseaux (CH);
Jean-Luc Denisart, Cully (CH);
Laurent Seydoux, Gillarens (CH)

(73) Assignee: Nestec S.A., Vevey (CH)

(*) Notice: Subject to any disclaimer, the term of this patent is extended or adjusted under 35 U.S.C. 154(b) by 491 days.

(21) Appl. No.: 14/118,938

(22) PCT Filed: May 25, 2012

(86) PCT No.: PCT/EP2012/059816
§ 371 (c)(1),
(2), (4) Date: Nov. 20, 2013

(87) PCT Pub. No.: WO2012/160190
PCT Pub. Date: Nov. 29, 2012

(65) Prior Publication Data
US 2014/0373723 A1    Dec. 25, 2014

(30) Foreign Application Priority Data

May 26, 2011   (EP) .................................... 11167716

(51) Int. Cl.
*A47J 31/40* (2006.01)
*A47J 31/52* (2006.01)
*A47J 31/44* (2006.01)

(52) U.S. Cl.
CPC ......... *A47J 31/407* (2013.01); *A47J 31/4457* (2013.01); *A47J 31/52* (2013.01)

(58) Field of Classification Search
CPC .............. B65D 85/8043; A47J 31/3695; A47J 31/0642
(Continued)

(56) References Cited

U.S. PATENT DOCUMENTS 7,028,603 B1* 4/2006 Gremillion ............. A47J 31/41
99/275
8,032,251 B2 10/2011 Monn
(Continued)

FOREIGN PATENT DOCUMENTS

EP         1992263       11/2008
JP       2001266241       9/2001
(Continued)

OTHER PUBLICATIONS

Saeco Xelsis Demo Part 2, YouTube Video link, https://www.youtube.com/watch?v=Ez3vl1YOaPs, dated Apr. 19, 2011, cited in Written Opinion issued in related Singapore Patent Application No. 201308379-5, dated Feb. 10, 2015.
(Continued)

*Primary Examiner* — Tu B Hoang
*Assistant Examiner* — Thomas Ward
(74) *Attorney, Agent, or Firm* — K&L Gates LLP

(57) ABSTRACT

A beverage preparation machine includes (i) a reservoir for a fluid, (ii) a brewing head adapted for receiving at least one ingredient capsule, (iii) a pump for pumping a predetermined volume of the fluid from the reservoir to the brewing head, (iv) a heating element for optionally heating the fluid pumped from the reservoir before it enters the capsule, (v) an electronic control board able to receive commands from a control panel of the machine. The control panel includes in combination: —a rotating wheel which is linked to the control board such that by rotating and/or pressing the wheel, a beverage preparation parameter is set in the control board, and —illuminated means, at least a portion of which has the shape of a schematic cup, which is linked to the control board such that the state of the beverage preparation parameter within the control board is represented on the means.

17 Claims, 2 Drawing Sheets

(58) Field of Classification Search
USPC .................. 700/233, 239; 222/129.1; 99/295
See application file for complete search history.

(56) References Cited

U.S. PATENT DOCUMENTS

| | | | |
|---|---|---|---|
| 8,364,321 B2* | 1/2013 | Kollep | A47J 31/407 141/83 |
| 2004/0090315 A1* | 5/2004 | Mackjust | B60R 25/104 340/426.13 |
| 2005/0016385 A1* | 1/2005 | Brinkemper | A47J 31/52 99/280 |
| 2008/0183330 A1 | 7/2008 | Monn | |
| 2011/0168026 A1* | 7/2011 | Cahen | A47J 31/52 99/280 |

FOREIGN PATENT DOCUMENTS

| | | |
|---|---|---|
| JP | 2008503251 | 2/2008 |
| RU | 2398283 | 6/2009 |
| WO | 2009135821 | 11/2009 |
| WO | 2010037806 | 4/2010 |
| WO | 2011046428 | 4/2011 |

OTHER PUBLICATIONS

User Manual for Saeco Xelsis Super-automatic espresso machine RI9946/47 Digital ID, dated Jan. 15, 2010, pp. 29-30, (http://www.p4c.philips.com/cgi-bin/cpindex.pl?ctn=RI9946/47&hlt=Link_UserManuals&mid=Link_UserManuals&scy=US&slg=AEN).
Written Opinion issued in related Singapore Patent Application No. 201308379-5 dated Feb. 6, 2015 (6 pages).

* cited by examiner

BEVERAGE PREPARATION SYSTEM

CROSS REFERENCE TO RELATED APPLICATIONS

The present application is a National Stage of International Application No. PCT/EP2012/059816, filed on May 25, 2012, which claims priority to European Patent Application No. 11167716.7, filed May 26, 2011, the entire contents of which are being incorporated herein by reference.

FIELD OF THE INVENTION

The present invention concerns a beverage preparation system, particularly a system comprising a beverage preparation machine and a capsule containing a beverage preparation ingredient, said capsule being designed to be inserted into said machine for preparation of a beverage by mixing under pressure a fluid and said ingredient into the capsule.

BACKGROUND OF THE INVENTION

Beverage preparation machines are well known in the food science and consumer goods area. Such machines allow a consumer to prepare at home a given type of beverage, for instance a coffee-based beverage, e.g. an espresso or a brew-like coffee cup.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules. In the following, it will be considered that the beverage machine of the invention is a beverage preparation machine working a semi-rigid or rigid capsule.

The machine comprises a receptacle for accommodating said capsule and a fluid injection system for injecting a fluid, preferably water, under pressure into said capsule. Water injected under pressure in the capsule, for the preparation of a coffee beverage according to the present invention, is preferably hot, that is to say at a temperature above 70° C. However, in some particular instances, it might also be at ambient temperature. The pressure inside the capsule chamber during extraction and/or dissolution of the capsule contents is typically about 1 to 6 bar for dissolution products, 2 to 12 bar for extraction of roast and ground coffee. Such a preparation process differs a lot from the so-called "brewing" process of beverage preparation—particularly for tea and coffee, in that brewing involves a long time of infusion of the ingredient by a fluid (e.g. hot water), whereas the beverage preparation process allows a consumer to prepare a beverage, for instance coffee within a few seconds.

The principle of extracting, infusing, and/or dissolving the contents of a closed capsule under pressure is known and consists typically of confining the capsule in a receptacle of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patent no EP 1 472 156 B1, and in EP 1 784 344 B1.

Machines allowing the application of this principle have already been described for example in patents CH 605 293 and EP 242 556. According to these documents, the machine comprises a receptacle for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand. In many instances, the capsule is inserted into a capsule holder, which is preferably (but not necessarily) detachable from the machine. The capsule holder loaded with the capsule is then inserted into the machine. Using a capsule holder for loading the capsule into the machine is not mandatory though, as the capsule can also be loaded directly into an opening The machine further comprises a fluid tank—in most cases this fluid is water—for storing the fluid that is used to dissolve and/or infuse and/or extract under pressure the ingredient(s) contained in the capsule. The machine comprises a heating element such as a boiler or a heat exchanger, which is able to warm up the water used therein to working temperatures (classically temperatures up to 80-90° C.). Finally, the machine comprises a pump element for circulating the water from the tank to the capsule, optionally though the heating element. The way the water circulates within the machine is selected via a selecting valve means, such as for instance a peristaltic valve of the type described in applicant's European patent application EP 2162653 A1.

When the beverage to be prepared is coffee, one interesting way to prepare the said coffee is to provide the consumer with a capsule containing roast and ground coffee powder, which is to be extracted with hot water injected therein.

Capsules have been developed for such an application, which are described and claimed in applicant's European patent EP 1 784 344 B1, or in European patent application EP 2 062 831.

In short, such capsules comprise typically:
- a hollow body and an injection wall which is impermeable to liquids and to air and which is attached to the body and adapted to be punctured by e.g. an injection needle of the machine,
- a chamber containing a bed of roast and ground coffee to be extracted,
- an aluminum membrane disposed at the bottom end of the capsule, closing the said capsule, for retaining the internal pressure in the chamber, the said membrane being associated with piercing means for piercing dispensing holes in the said aluminum membrane when said internal pressure inside the chamber reaches a certain predetermined value,
- optionally, means configured to break the jet of fluid so as to reduce the speed of the jet of fluid injected into the capsule and distribute the fluid across the bed of substance at a reduced speed.

Beverage preparation machines and capsules as described above, for many of them, are designed to give the consumer the choice of preparing the beverage he likes amongst a whole range of beverage products.

For each beverage type, the dose of ingredients contained in a capsule are carefully dosed, to correspond to a volume to be dispensed in the cup. Such a volume is optimized to guarantee an optimal organoleptic profile, in terms of flavors, aromas, and texture.

Some machines are automatically set by recognition of the capsule type, so that the machine adapts the volume of beverage that is dispensed in the cup, depending on the beverage that is prepared. Other machines can be programmed manually, so that the user can chose a small cup or a large cup dispensing, whatever the beverage type.

However, such machines have the disadvantage that they lack flexibility to give an easy access to the volume selection at each serve: automated machines do not give any possibility to the consumer to divert from the pre-programmed dispensing volume, and the programmable machines require to be re-programmed each time the user wants to adapt the cup size.

SUMMARY OF THE INVENTION

The drawbacks of known beverage preparation systems, as set out above, are solved by the presentation invention with a beverage preparation machine comprising:
(i) a reservoir for a fluid,
(ii) a brewing head adapted for receiving at least one ingredient capsule,
(iii) a pump for pumping a predetermined volume of said fluid from said reservoir to said brewing head, such that said fluid can be injected into said capsule to mix with said ingredient under pressure and produce a predetermined volume of beverage,
(iv) a heating element for optionally heating said fluid pumped from said reservoir before it enters the capsule,
(v) an electronic control board able to receive commands from a control panel of the machine, and actuate operation of the pump, heating element, control panel, and/or brewing head,
characterized in that said control panel comprises in combination:
  a rotating wheel which is linked to the control board such that by rotating the wheel, a beverage preparation parameter is set in said control board, and
  illuminated means, at least a portion of which has the shape of a schematic cup, which is linked to said control board such that the state of said beverage preparation parameter within said control board is represented on said means.

The schematic cup can have any shape as long as it represents schematically a volume to be dispensed in an empty container. The shape can be a rectangle made of superimposed bars, or a series of dots (in line, arc, circle or other shape). The shape can be vertical, horizontal, or placed in any other direction.

In a preferred embodiment of the invention, the beverage preparation parameter comprises a volume V to be pumped from the reservoir, to be represented on the illuminated means as a fraction of said schematic cup total volume. This volume V corresponds to the volume of the beverage that will eventually be dispensed into the cup, with the difference of a small volume of beverage which may stay in the ingredient capsule and also in part of the machine pipes, e.g. between 1 and 10 cl, preferably between 1 and 5 cl (the final in-cup volume is slightly less than the initial volume of water pumped from the reservoir).

More particularly, the volume V preferably corresponds to a volume of prepared beverage, which is comprised between 10 and 400 ml, preferably between 30 and 300 ml, more preferably between 50 and 250 ml.

Advantageously, said wheel can comprise a press-button degree of liberty, so that a consumer can press it as a push button.

More preferably in this case, said wheel is the only command button for the machine, serving as:
(i) a rotating selector, for selecting at least one beverage preparation parameter, and
(ii) a press-button selector, for validating or cancelling each of said beverage preparation parameter, and to start a brewing cycle.

For instance a user can set a beverage preparation parameter by rotating the wheel, and validate the setting by short pressure onto the wheel. If the setting suits the user needs, a brewing cycle can be started by an additional short pressure onto the wheel. In case the setting does not fit the user needs, it can be cancelled by a long pressure onto the wheel. The same setting process can be used for several preparation parameters, each being set by wheel rotation then validated by wheel push, so that once a parameter is set and validated, the wheel is used similarly for setting and validating another parameter, until all parameters are set and validated, so that an additional pressure on the wheel starts a beverage preparation (i.e. brewing) cycle. Preferably in this case, the number of various parameters is quite limited to shorten and simplify the machine usage. Highly preferably, not more than two parameters are to be set.

Such a control panel configuration comprising one single command switch (i.e. the wheel) is particularly simple, intuitive, and easy to use, compared to beverage preparation machines having a control panel with more than one single command switch; it solves the disadvantages of fully automated or manual machines of the art.

Alternatively, the control panel of the machine can comprise, in addition to the selector wheel, at least one other selector for pumping fluid from the reservoir either: directly into the capsule, or via said heating element such that said fluid entering said capsule is hot.

More preferably, said selector comprises one push-button for pumping water at room temperature, and another push-button for pumping water to be heated.

In one first alternative embodiment of the present invention, said illuminated means comprises a plurality of superimposed retro-illuminated LED (Light Emitting Diodes) lamps having the shape of: bars, dots, and/or being frustoconical, said LED lamps being disposed such as to represent a cup shape.

In a second alternative embodiment of the present invention, said illuminated means comprises a black and white or colour LCD (Liquid Crystal Display), OLED (Organic Light-Emitting Diode), or AMOLED (Active-Matrix Organic Light-Emitting Diode) screen.

Advantageously, the rotating wheel can comprise rotation blocking means to prevent said wheel to rotate more than half a rotation, preferably more than a quarter of a rotation.

Further, said wheel preferably comprises clicking means to produce audible and/or touch sensitive feedback during rotation, so as to give sensitive feedback to the user during setting of the machine parameter(s). Preferably, each audible click produced by the rotating wheel during rotation, corresponds to one increment in the parameter that is set by the rotation.

Advantageously, the wheel can be illuminated. In this case, it is made from a translucent material, and comprises at least one LED disposed therein, or similar source of light.

In a highly preferred embodiment of the present invention, said wheel protrudes from the surface of the machine, so as to be easy to sense and manipulate by the user finger.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
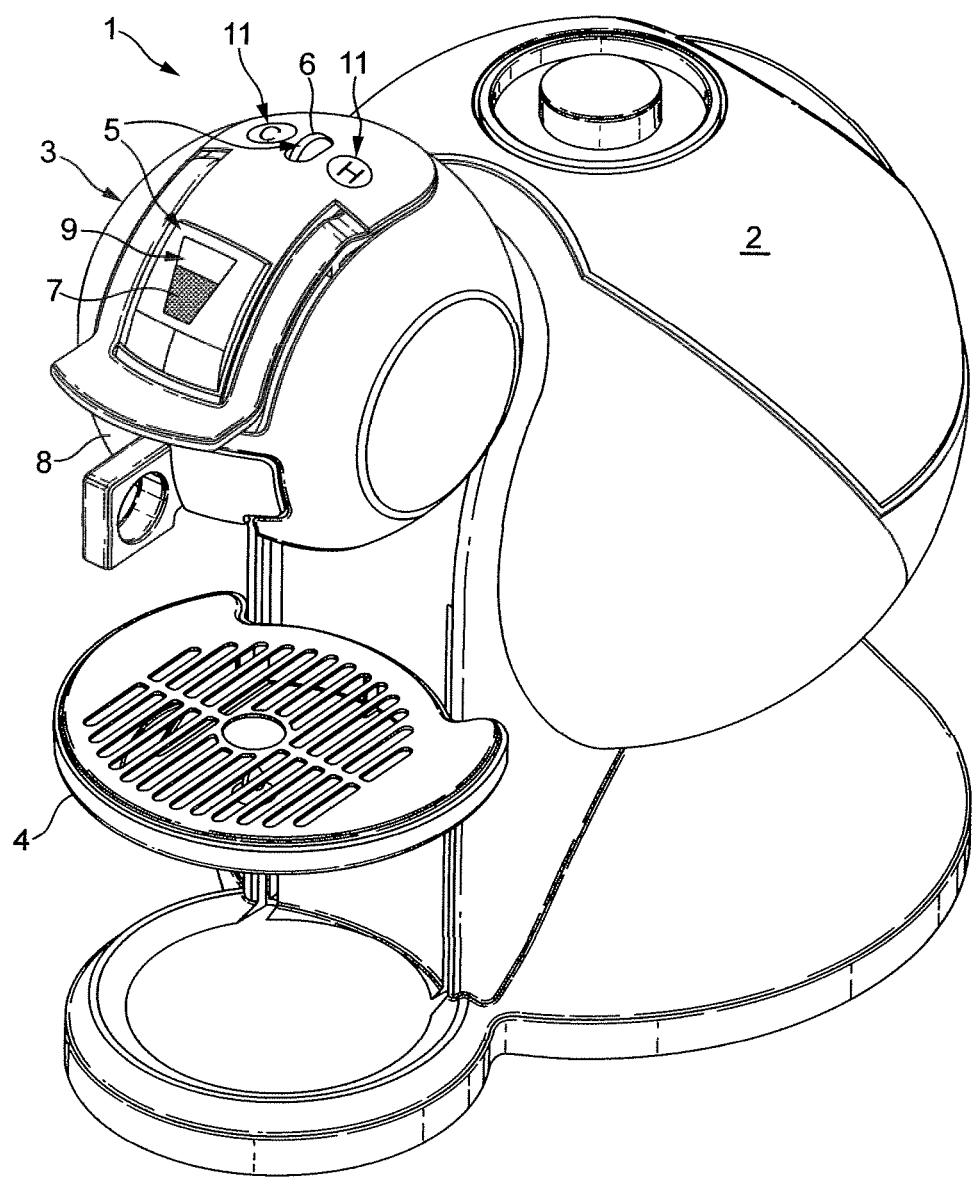
FIG. 1 is a perspective view of a machine comprising a control panel according to a first possible embodiment of the invention.

The present invention concerns a beverage preparation machine 1, as illustrated in FIG. 1, which comprises:
(i) a reservoir 2 for a fluid,
(ii) a brewing head 3 adapted for receiving at least one ingredient capsule (not illustrated in the drawing),
(iii) a pressure pump for pumping a predetermined volume of said fluid from said reservoir 2 to said brewing head 3, such that said fluid can be injected into said capsule to mix with said ingredient under pressure, and thereby produce a predetermined volume of beverage which is dispensed in a cup (not shown in the drawing) placed onto the cup tray 4.

The machine further comprises a heating element for optionally heating said fluid pumped from said reservoir before it enters the capsule, and an electronic control board able to receive commands from a control panel 5 of the machine, and actuate operation of the pump, heating element, control panel, and/or brewing head, According to the invention, the control panel 5 comprises in combination:
  a rotating wheel 6 which is linked to the control board such that by rotating said wheel, a beverage preparation parameter is set in said control board, and
  illuminated (or coloured, or tactile) means 7, at least a portion of which has the shape of a schematic cup, which is linked to said control board such that the state of said beverage preparation parameter is represented on said means.

As shown in FIG. 1, the machine can comprise a removable capsule holder 8, which is used to load a capsule there into, and place the loaded capsule holder into the brewing head for operation of the machine.

As illustrated in FIG. 1, the beverage preparation parameter comprises a volume V to be pumped from the reservoir, which is represented on the illuminated means 7 as a fraction of said schematic cup total volume. More precisely, the volume V is represented schematically as a volume of product in a schematic representation of a cup 9.

The volume V corresponds to a volume of water that is pumped from the reservoir, which is comprised between 50 and 250 ml. This volume almost corresponds to the final volume of final beverage that will be delivered in the cup. In some instances however, the in-cup volume can be a few cl less than the pumped volume of water, due to some liquid staying within the capsule and/or machine fluid pipes, not being dispensed. In the following description of specific embodiments of the invention, for simplification purposes, it will be taken for granted that the pumped volume V as set by the user on the machine control panel and the beverage volume eventually dispensed in the cup, are the same. Such a volume range covers from ristretto coffees, to large size beverages, such as long tea cups, or brew-like coffee cups or Americano coffee cups.

In a first alternative embodiment of the present invention illustrated in FIG. 1, the beverage preparation machine comprises an LCD—Liquid Crystal Display—screen which is designed to display at least one beverage preparation parameter such as volume to be dispensed as shown in the drawing. More preferably, the LCD screen is able to display several menus which can be displayed alternately or simultaneously. The user switches from and menu displayed to another one by using the scroll wheel, validating his choice by using one push button located onto the control panel of the machine, or by directly pressing onto the scroll wheel to validate.

Such different menus may include information regarding the beverage preparation parameters like recipes, or parameters for the preparation of a beverage such as volume or temperature of the dispensed beverage, or settings of the machine (standby mode activation for instance).

Figure 2:
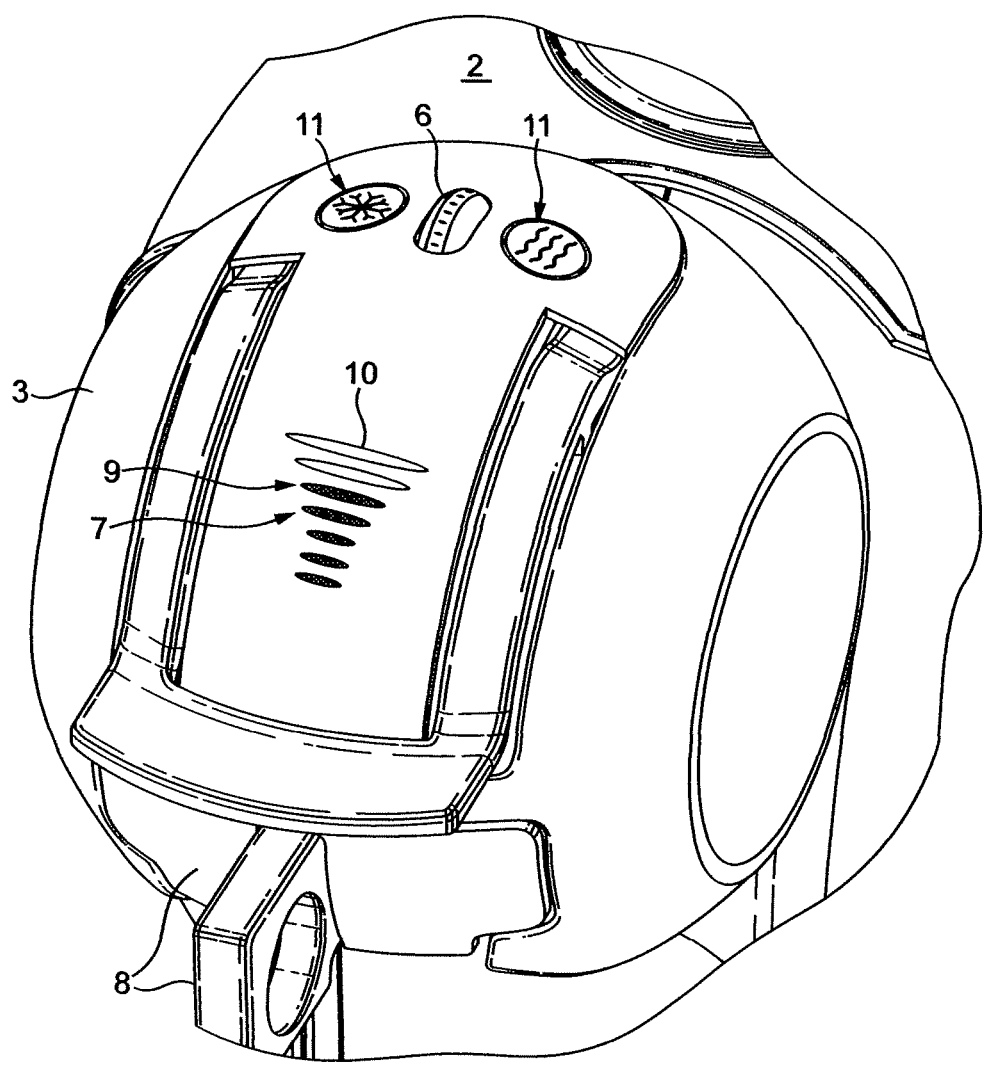
FIG. 2 is an enlarged partial perspective view of the extraction head of a beverage preparation machine with a control panel according to the a second embodiment.

In a second alternative embodiment of the present invention illustrated in FIG. 2, the illuminated means 7 of the beverage preparation machine comprises a series of superimposed retro-illuminated LED bars 10, each LED bar having a shape such that the group of LED bars represents a cup 9.

In this embodiment, in addition to the illuminated means 7, the control panel 5 of the beverage preparation machine 1 comprises a set of two buttons 11 to select the temperature of the fluid that will be injected into the capsule for mixing with the capsule contents and preparing a beverage. Typically, one button selects for ambient temperature (i.e. "cold"), while the other button selects for hot fluid to prepare a hot beverage.

Said rotating wheel can however additionally comprise a press-button degree of liberty, so that a consumer can press it as a push button.

In a third embodiment of the invention, the control panel 5 of the machine comprises the illuminated means 7 similarly to that described in relation to the second embodiment described above, as well as a wheel 6 which can rotate but also be used as a push button. In this case, said wheel 6 is the only command button for the machine, serving as:
  (i) a rotating selector, for selecting at least one beverage preparation parameter, and
  (ii) a press-button selector, for validating or cancelling each of said beverage preparation parameter, and to start a brewing cycle.

For instance a user can set a beverage preparation parameter by rotating the wheel, and validate the setting by short pressure onto the wheel. If the setting suits the user needs, a brewing cycle can be started by an additional short pressure onto the wheel. In case the setting does not fit the user needs, it can be cancelled by a long pressure onto the wheel. The same setting process can be used for several preparation parameters, each being set by wheel rotation then validated by wheel push, so that once a parameter is set and validated, the wheel is used similarly for setting and validating another parameter, until all parameters are set and validated, so that an additional pressure on the wheel starts a beverage preparation (i.e. brewing) cycle. Preferably in this case, the number of various parameters is quite limited to shorten and simplify the machine usage. Highly preferably, not more than two parameters are to be set.

Such a control panel configuration comprising one single command switch (i.e. the wheel) is particularly simple, intuitive, and easy to use, compared to beverage preparation machines having a control panel with more than one single command switch.

In a fourth embodiment, the illuminated means comprises a mechanical level indication that replaces the LDC screen or the LED bars. For instance, said mechanical level indication can be a coloured (e.g. green) element that is movable up/down behind openings cut through the surface of the control panel. The movement of the coloured element is linked mechanically to the rotation of the selector wheel. The mechanical element is retro-illuminated such that it is visible through the openings of the control panel. This is a cheaper solution to that involving LED bars or a LCD screen, while providing similar advantages to the consumer.

In any of the preceding embodiments described, the rotating wheel can comprise rotation blocking means to prevent said wheel to rotate more than a quarter of a rotation.

Furthermore, said wheel then comprises clicking means to produce audible and touch sensitive feedback during rotation, so as to give sensitive feedback to the user fingers during setting of the machine parameter(s). Each audible and sensitive click produced by the rotating wheel during rotation, corresponds to one increment in the parameter that is set by the rotation, which is represented on the illuminated means by one more or one less LED bar which is illuminated so as to represent more or less volume to be dispensed in the cup.

With such a wheel, it is possible to set the machine before starting a beverage preparation cycle, without even looking at the illuminated means. In that case, setting a volume to be dispensed is easy: the user first rotates the wheel in an extreme direction until the rotation is blocked. For instance, by rotating the wheel downwardly, the volume is set to the lowest in-cup volume possible (no bars are illuminated on the LED bar screen). Then the user increments a higher volume by rotating the wheel upwards, one click at a time, until a desired volume is reached. While rotating the wheel, feedback is given to the user by audible (i.e. click) and sensitive means (i.e. sensitive feedback that each incremental rotation requires a small effort to reach the next incremental position of the wheel). When the user has set the desired volume to dispense, for instance five increments out of seven (seven representing the maximum volume that can be dispensed, which is represented on the LED bar screen by all seven LED bars illuminated), then five LED bars are illuminated as illustrated in FIG. 2, and the user can start a beverage preparation cycle by either pressing one of the buttons "hot" or "cold", or alternatively press onto the wheel to save the volume parameter that has just been set, and then either:

start a beverage brewing cycle by pressing onto the wheel a second time, or use the wheel to start a second parameter, for instance the temperature if no specific temperature buttons are present on the control panel 5.

In that second case, the user rotates the wheel up or down to select "hot" or "cold" and then presses again onto the wheel to validate her/his choice. A beverage preparation cycle then starts automatically, and the machine stops automatically when the selected volume has been dispensed in the cup.

Although one main problem underlying the present invention is to provide the user with a user-friendly control panel for easily, conveniently and intuitively setting and using the beverage preparation machine, another problem underlying the invention is also to provide the user with a control panel that provides a maximum of flexibility in setting the desired preparation parameters, while requiring a minimum of buttons, levers or switches to be actuated.

This problem is met with a display that graphically represents the cup to be filled, and that is linked to a very user-friendly actuator in the form a wheel which rotates such that less than two, preferably less than one, more preferably less than half a full rotation (i.e.) 360° of the wheel is necessary to set a volume V of water to be pumped from the reservoir (i.e. which corresponds almost to the final volume of dispensed beverage in cup) which is comprised between 0% and 100% of the maximum volume of water that can be pumped for preparation of one serving. Preferably, the maximum volume that can be pumped by the machine to prepare one beverage serve is 400 ml.

In a more preferred embodiment, a rotation of between 15° and 180° is necessary to set a volume V to be pumped that is comprised between 0 and 400 ml, preferably between 30 and 300 ml, more preferably between 50 and 250 ml. In that last instance, the minimum volume V that can be selected for preparing a beverage corresponds to a pumped volume of water from the reservoir which is 50 ml, and also corresponds to an in-cup serving size of between 45 and 50 ml, depending on the volume of small beverage drops remaining within the machine and capsule, that are not dispensed in the cup.

In order to allow a very fine tuning/setting by the user, of the fluid volume V to be pumped from the reservoir (which almost corresponds to the in-cup delivery volume of the prepared beverage), the rotation of the wheel along the angle that covers the full range of volumes that can be set (0% to 100%) is preferably divided into rotation angle segments. Each segment corresponds to one fraction of the total volume V that can be set by the user, and is to be displayed as such on the illuminated means.

In the case of the second and third embodiments described above with reference to FIG. 2, the machine can be designed for instance such that the full range of volumes that can be set (i.e. between 0% and 100% of the maximum volume that can be pumped for one serve) is covered by a circular wheel rotation amplitude of 0° to 120°.

In a preferred embodiment of the invention, each fraction of the volume range that can be selected manually with the wheel, is displayed on the illuminated means as a corresponding illuminated fraction of the cup representation. For instance, if the rotating wheel is set such that the full range of selectable volumes is divided into seven fractions, the cup representation in the illuminated means of the machine is also divided into seven corresponding fractions. For each additional volume fraction that is selected by rotating the wheel, one corresponding additional fraction of the cup is illuminated on the illuminated means. The number of fractions for a full volume range is at least 3, preferably at least 4, more preferably at least 5, and most preferably at least 7, but not higher than 30. Each fraction of the cup representation on the illuminated means can be for instance a bar that belongs to a series of superimposed retro-illuminated LED bars 10 as described above in reference to FIG. 2, each LED bar having a shape such that the group of LED bars represents a cup 9.

Importantly, it is to be noted that all fractions of volume as selected with the wheel and as displayed in the illuminated means, do not necessarily correspond to pumped volumes which are equivalent for all selected fractions. For instance, the first fraction in the selectable volume range can correspond to 60 ml of liquid to be pumped from the reservoir, the second fraction which can be then selected will correspond to an additional 30 ml, whereas the third fraction that will be selected if the user keeps rotating the wheel will correspond to an additional 50 ml, etc., until the user reaches the maximum volume that can be pumped from the reservoir by rotating the wheel for a selection of the last fraction in the selectable volume range.

In one further embodiment of the invention, the first fraction of the selectable volume range can be preselected automatically in the beverage machine program, such that at machine start, the first fraction is already preselected and represented on the illuminated means as one fraction of the cup representation. For larger volumes, the user then rotates the wheel for selecting additional volume fractions.

It will be appreciated that the various possibilities and embodiments described above can be combined, in order to achieve the most convenient control panel. Typically, a control panel using LED bar illuminated means, a rotating wheel for selection of volume, and two buttons for "hot" or "cold" selection, is preferred.

However, a similar version without the temperature selectors, that are replaced by a selection and validation by rotating/pressing the wheel as described above is also certainly very advantageous, and particularly, brings the advantage that users with limited or no eyesight can rapidly learn and use such a machine.

In all embodiments described above, the wheel protrudes from the surface of the machine, so as to be easy to sense and manipulate by the user finger.

Last but not least concerning the wheel selector, in one possible embodiment of the invention, the wheel is not a complete circle (360°), but only a "rocker" switch, for instance shaped as a half moon. This kind of rocker lever can be used when there is no room for a full wheel in the control panel 5 of the machine, for example if the beverage preparation machine is particularly small in size. In such a case, by holding the rocker lever in one of the end positions, the settings and LED bars levels move up/down, incrementally corresponding to each of the impulsions given by the user using the rocker-like wheel.

The fluid reservoir can be integrated into the machine casing, or it can be remote from the machine. In the latter case, the reservoir can be for instance a water bottle. In that case, the machine comprises a tubing connected in a fluid manner to the fluid pump, said tubing being adapted to be plunged into the remote reservoir (e.g. water bottle).

The rotating wheel described above can also be virtual and take the form of a sensitive track-pad, onto which the user slides a finger, like for a physical rotating wheel.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A beverage preparation machine comprising:
a reservoir for a fluid;
a brewing head adapted for receiving at least one ingredient capsule containing an ingredient;
a pump for pumping a predetermined volume of the fluid from the reservoir to the brewing head, such that the fluid can be injected into the at least one ingredient capsule to mix with the ingredient under pressure and produce a predetermined volume of beverage;
an electronic control board able to receive commands from a control panel of the beverage preparation machine and actuate operation of at least one component selected from the group consisting of the pump, the control panel, the brewing head,
the control panel comprising in combination:
a rotating wheel which is linked to the electronic control board such that by rotating or and/or pressing the rotating wheel, a beverage preparation parameter is set in the electronic control board, and
an illuminated or colored member selected from the group consisting of (i) a screen that is a black and white Liquid Crystal Display (LCD) screen, a color LCD screen, an Organic Light-Emitting Diode (OLED) screen, or an Active-Matrix Organic Light-Emitting Diode (AMOLED) screen, (ii) a plurality of superimposed retro-illuminated LED lamps, the plurality of superimposed retro-illuminated LED lamps comprising a first bar, a second bar, and a third bar, the second bar located between the first bar and the third bar, the first bar is shorter than the second bar and is shorter than the third bar, and the second bar is shorter than the third bar and is longer than the first bar, and (iii) a plurality of superimposed retro-illuminated LED lamps, the plurality of superimposed retro-illuminated LED lamps having a shape that is frustoconical,
at least a portion of the illuminated or colored member has a shape of a schematic cup having a total volume, the illuminated or colored member is linked to the electronic control board such that a state of the beverage preparation parameter within the electronic control board is represented on the illuminated or colored member, the beverage preparation parameter comprises a volume to be pumped from the reservoir and to be represented on the illuminated or colored member as a fraction of the total volume of the schematic cup total volume,
each fraction of a volume range that can be selected manually with the rotating wheel is displayed on the illuminated or colored member as a corresponding illuminated or colored fraction of the schematic cup, such that for each additional volume fraction that is selected by rotating or pressing the rotating wheel, one corresponding additional fraction of the schematic cup is illuminated or colored on the illuminated or colored member.

2. The beverage preparation machine according to claim 1, wherein a number of fractions for a full selectable volume range is at least 3 but not higher than 30.

3. The beverage preparation machine according to claim 1, wherein the schematic cup total volume corresponds to a volume of prepared beverage between 10 and 400 ml.

4. The beverage preparation machine according to claim 1, wherein the rotating wheel comprises a press-button degree of liberty, so that a consumer can press the rotating wheel as a push button.

5. The beverage preparation machine according to claim 4, wherein the rotating wheel is the only command button for the beverage preparation machine, serving as:
a rotating selector configured to select the beverage preparation parameter, and
a press-button selector configured to validate or cancel, each of the beverage preparation parameter and to start a brewing cycle.

6. The beverage preparation machine according to claim 1, wherein the control panel comprises at least one selector configured to pump fluid from the reservoir either directly into the at least one ingredient capsule or via a heating element such that the fluid entering the at least one ingredient capsule is hot.

7. The beverage preparation machine according to claim 6, wherein the at least one selector comprises (i) one push-button for pumping the liquid at a room temperature and (ii) another push-button for pumping the liquid to be heated.

8. The beverage preparation machine according to claim 1, wherein the rotating wheel is illuminated.

9. The beverage preparation machine according to claim 1, wherein the rotating wheel protrudes from a surface of the beverage preparation machine.

10. A beverage preparation machine comprising:
a reservoir for a fluid;
a brewing head adapted for receiving at least one ingredient capsule containing an ingredient;
a pump for pumping a predetermined volume of the fluid from the reservoir to the brewing head, such that the fluid can be injected into the at least one ingredient capsule to mix with the ingredient under pressure and produce a predetermined volume of beverage;
a heating element for heating the fluid pumped from the reservoir before the fluid enters the at least one ingredient capsule;
an electronic control board able to receive commands from a control panel of the beverage preparation machine and actuate operation of at least one component selected from the group consisting of the pump, the heating element, the control panel, and the brewing head,
the control panel comprising:
a rotating wheel which is linked to the electronic control board such that by rotating or pressing the wheel, a beverage preparation parameter is set in the electronic control board, and
an illuminated or colored member selected from the group consisting of (i) a screen that is a black and white LCD screen, a color LCD screen, an OLED screen, or an AMOLED screen and (ii) a plurality of superimposed retro-illuminated LED lamps, the plurality of superimposed retro-illuminated LED lamps comprising a first bar, a second bar, and a third bar, the second bar located between the first bar and the third bar, the first bar is shorter than the second bar and is shorter than the third bar, and the second bar is shorter than the third bar and is longer than the first bar, and (iii) a plurality of superimposed retro-illuminated LED lamps, the plurality of superimposed retro-illuminated LED lamps having a shape that is frustoconical,
at least a portion of the illuminated or colored member has a shape of a schematic cup having a total volume, the illuminated or colored member is linked to the electronic control board such that a state of the beverage preparation parameter within the electronic control board is represented on the illuminated or colored member, the beverage preparation parameter comprises a volume to be pumped from the reservoir and to be represented on the illuminated or colored member as a fraction of the total volume of the schematic cup,
wherein each fraction of a volume range that can be selected manually with the rotating wheel is displayed on the illuminated or colored member as a corresponding illuminated or colored fraction of the schematic cup, such that for each additional volume fraction that is selected by rotating or pressing the rotating wheel, one corresponding additional fraction of the schematic cup is illuminated or colored on the illuminated or colored member.

11. The beverage preparation machine according to claim 1, wherein the electronic control board is configured such that the illuminated or colored member is activated to represent a fraction of the volume range only when the volume selected to be pumped is larger than a lowest possible in-cup volume.

12. The beverage preparation machine according to claim 1, wherein the rotating wheel is distant from the illuminated and colored member.

13. The beverage preparation machine according to claim 1, wherein the rotating wheel is configured to produce audible and touch sensitive clicks during rotation to provide tactile feedback to a finger of a user when the user sets the beverage preparation parameter.

14. The beverage preparation machine according to claim 13, wherein each of the audible and touch sensitive clicks corresponds to one volume fraction increment within the volume range.

15. The beverage preparation machine according to claim 1, wherein the rotating wheel is located on the brewing head.

16. The beverage preparation machine according to claim 1, wherein the beverage preparation machine further comprises a removable capsule holder configured to receive the at least one ingredient capsule and be placed into the brewing head for operation of the beverage preparation machine.

17. The beverage preparation machine according to claim 1, wherein the beverage preparation machine further comprises a frame comprising at least one frame surface extending around the rotating wheel, and the at least one frame surface is free from any sign, mark or scale.

* * * * *